Oct. 6, 1964    J. W. NORTH    3,151,964

PROCESS OF MANUFACTURING FUSED SILICA

Filed June 10, 1958    4 Sheets-Sheet 2

INVENTOR:
JOHN. W. NORTH

BY:

ATTORNEY

Oct. 6, 1964          J. W. NORTH          3,151,964

PROCESS OF MANUFACTURING FUSED SILICA

Filed June 10, 1958          4 Sheets-Sheet 3

INVENTOR:
JOHN W. NORTH

BY:

ATTORNEY

INVENTOR:
JOHN W. NORTH

United States Patent Office 3,151,964
Patented Oct. 6, 1964

3,151,964
PROCESS OF MANUFACTURING FUSED SILICA
John W. North, Atlanta, Ga., assignor, by mesne assignments, to Glasrock Products, Inc., Atlanta, Ga., a corporation of Georgia
Filed June 10, 1958, Ser. No. 741,054
8 Claims. (Cl. 65—18)

This invention relates to a process for manufacturing fused silica, and is more particularly concerned with both the process of manufacturing the fused silica from sand and the electric furnace employed in such manufacture.

When any of the crystalline form of silica is heated to about 3142° F. (1728° C.), the silica crystals melt, forming a very viscous liquid. Far above the melting temperature, silica is not very fluid. To free the liquid from bubbles, it is, therefore, necessary to heat it at least 500° C. above its melting point.

High viscosity is one of the most important properties of liquid silica and a property which I utilize according to the present invention. Molten silica is so viscous at its freezing point that upon cooling it does not crystallize and remains as an uncooled liquid below its melting point. As cooling continues, the liquid silica gradually assumes the rigidity of a glassy solid. Non-crystalline forms of silica are known as fused silica, amorphous silica, vitreous silica, silica glass and quartz glass; however, the term fluid silica as used hereinafter is synonymous with vitreous silica, amorphous silica, silica glass or quartz glass.

Fused silica has a density of 2.20 grams per cubic centimeter, a refractive index of 1.46 and a hardness of approximately 7. It has an extremely low and regular coefficient of thermal expansion. The coefficient over a range of 32°–1832° F. (0°–1000° C.) is $5 \times 10^{-7}$ inches per inch of length per degree centigrade change in temperature. It is substantially impossible to break fused silica by thermal shock, and even at a bright red heat fused silica has been plunged into water without breakage. Fused silica is, also, substantially chemically inert at ordinary temperatures and resists the action of all common acids and alkalies, with the exception of hydrofluoric acid (HF). This chemical stability, coupled with its physical properties, makes fused silica an invaluable industrial and laboratory material. Even though it is, theoretically, unstable below 3142° F., actually for industrial and scientific uses it is regarded as an extremely stable material. Because of its high melting point and high viscosity, fused silica in the past has been difficult and expensive to prepare. Fused silica has several very important uses, not the least of which is the employment of this material in the manufacture of ceramic raw materials. The importance of this material is growing daily.

In the past, fused silica has been considered an extremely expensive commodity since as pointed out above its preparation has been difficult. One process for the manufacture of fused silica has been to melt large quartz crystals in an evacuated furnace or by means of oxyhydrogen flame. Many processes have been suggested for the reducing of pure glass sand or silica flour in an electric arc. One such process is known as the centrifugal process and embodies the spinning of a container for the silica around the carbon arcs so as to withdraw the silica from the arc to permit only a small portion of the silica to be affected by the arc at any one time. When the silica is centrifuged about a vertical axis, the electrodes are diagonally brought together within the silica from a stationary mounting above the centrifuge. Of course, in this latter process, large quantities of heat are lost to the atmosphere and refractory materials must be used in the furnace construction.

Thus the prior art processes are plagued with the problems of low conversion, high heat loss, expensive equipment, and heavy and bulky moving parts. Further, to maintain an arc sufficient to melt reasonable quantities of the silica, it is necessary to employ high voltage and corerspondingly high currents.

Contrary to the prior art parctices, I have devised an electric arc furnace and process of producing fused silica and other refractions which employs a relatively low voltage current and yet maintains a substantially wide arc or spacing between the tips of the electrodes. In my process, it is not necessary to employ movable containers for the silica during the conversion thereof, nor is it necessary to employ heavy and bulky insulating materials to surround the silica being melted. Briefly, my process employs a pair of aligned, horizontally disposed, electrodes which are brought together initially to strike an arc. The silica raw material, which is substantially a pure glass sand or flour or other material containing granular quartz or any other lower form of silica, surrounds these electrodes. The electrodes are then withdrawn gradually so that at all times an egg, ball or globe of molten fused quartz is maintained between the electrodes so that the gases, such as carbon dioxide, from the disintegration of the electrodes, are essentially captured within this ball. Thus, at all times, there is a conductive path formed by the ionized gas or conducting gas between the electrodes, even through the electrodes may be relatively far apart.

As the reaction continues, the heat from the arc is transmitted through the fused silica ball to melt progressively the silica flour next adjacent the ball. When the silica flour becomes liquefied and converted into molten silica, the same tends to replace the silica in the ball as this latter silica is pulled by gravity down below the ball, thus permitting the additional heat to heat and melt additional silica flour. When a ball of sufficient size has been prepared, the electrodes are withdrawn so that the arc is broken and the electrodes are no longer in contact with the ball. Thereafter, the ball and the surrounding unfused silica are dumped from the furnace and separated from each other. If a high purity fused silica is desired, the partly fused outer crust of the ball is chipped or otherwise removed, thereby leaving the inner ball which is essentially pure. The ball may be further processed by comminuting to desired particle size.

During the entire time the furnace is in operation, the walls of the furnace are at a low temperature since the surrounding raw material is an effective insulator for the heat created by the arc. Also, very little heat is lost during this process since the heat will tend to be transferred to heat and melt the surrounding raw materials.

From the above description, it is apparent that I have devised a very inexpensive and practical method of producing fused silica on a commercial scale. Compared with prior art processes, I am able to produce about twice the amount of fused silica with the same amount of current. This increase in efficiency is probably due to the fact that, in my method, the heat source and the hot materials are surrounded by the furnace charge of silica flour. This silica flour, surrounding the electric arc and the expanding ball of molten silica, is thus preheated before it is progressively melted. For this reason, it is apparent that very little heat escapes through the surrounding layer of silica flour. The silica flour is fine grained and loose and makes an excellent thermal insulation.

In the prior art systems for melting silica electrically, the electrodes are usually much larger than is required in my process; and, hence, in the prior art processes, the loss of heat by conduction back through the electrodes is substantially greater than the loss of heat through the electrodes as used in my process. In my invention, there are no walls or roof of the furnace exposed to extreme temperatures, and hence no expensive refractory lining is required. Excessive maintenance costs are, therefore, essentially eliminated.

The apparatus, hereinafter to be disclosed in detail, is relatively simple and inexpensive and may be set up in small units, making it possible to build and operate plants inexpensively in small units in locations close to markets and sources of raw material. Also, my furnace is so arranged that dumping and recharging of the furnace is more quickly and easily accomplished, and there is no danger of the silica recrystallizing.

Accordingly, it is an object of the present invention to provide a low cost method of producing fused silica.

Another object of my invention is to provide a process of producing fused silica which will employ a relatively low voltage current and utilize this current efficiently to produce substantial quantities of the fused material.

Another object of my invention is to provide a process which produces fused silica in substantially pure form.

Another object of my invention is to provide a process which will produce fused silica with a low fuel or energy cost.

Another object of my invention is to provide a process for producing fused silica without the expense or necessity associated with utilizing and repairing refractory furnace linings.

Another object of my invention is to provide an electric furnace process for producing fused silica which uses a minimum of energy and consumes a minimum of electrode material.

Another object of my invention is to provide, in a process for producing fused silica, a convenient and inexpensive method for dumping the molten silica and reloading the furnace, making sure that the molten silica is dumped quickly and cooled quickly so that the fused silica does not recrystallize in cooling.

Other and further objects and advantages of the present invention will become apparent from the following description when taken in conjunction with the accompanying drawings in which like characters of reference designate corresponding parts throughout the several views, and wherein.

Figure 1:
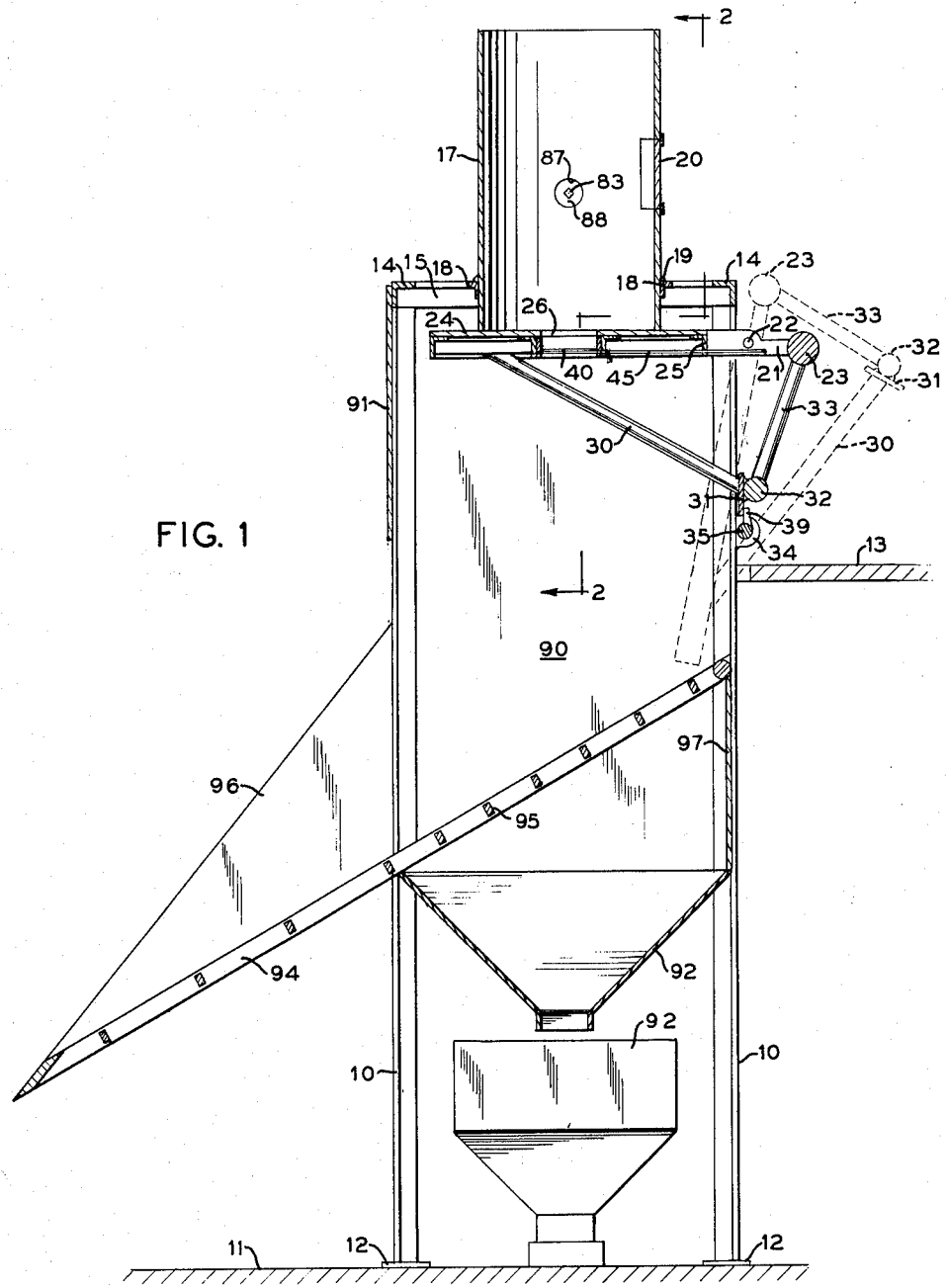
FIG. 1 is a vertical cross sectional view of a furnace manufactured in accordance with the present invention for converting silica flour into fused silica.

Referring now in detail to the embodiments chosen to illustrate the invention, it being understood that the invention is not limited to the specific embodiment here disclosed, numeral 10 denotes the upright standards of the frame or supporting structure of the furnace of my invention. These standards 10 are mounted on a suitable surface 11 by means of feet 12. Surface 11 is usually on the main floor of a building and the standards 10 usually extend about one and one-half stories above surface 11, the floor 13 being provided as a suitable platform for the operators of my furnace to load and inspect the furnace.

Joining the upper ends of the four standards 10 is a square frame consisting of angle arms 14 and inverted channel member 15. The inner surface of the inverted channel member 15 is welded at 16 to a hollow cylindrical member forming the furnace body 17. Angle irons 18 run between intermediate portions of channel members 15 and are welded at 19 to furnace body 17 so as to provide additional support for the furnace body.

Figure 2:
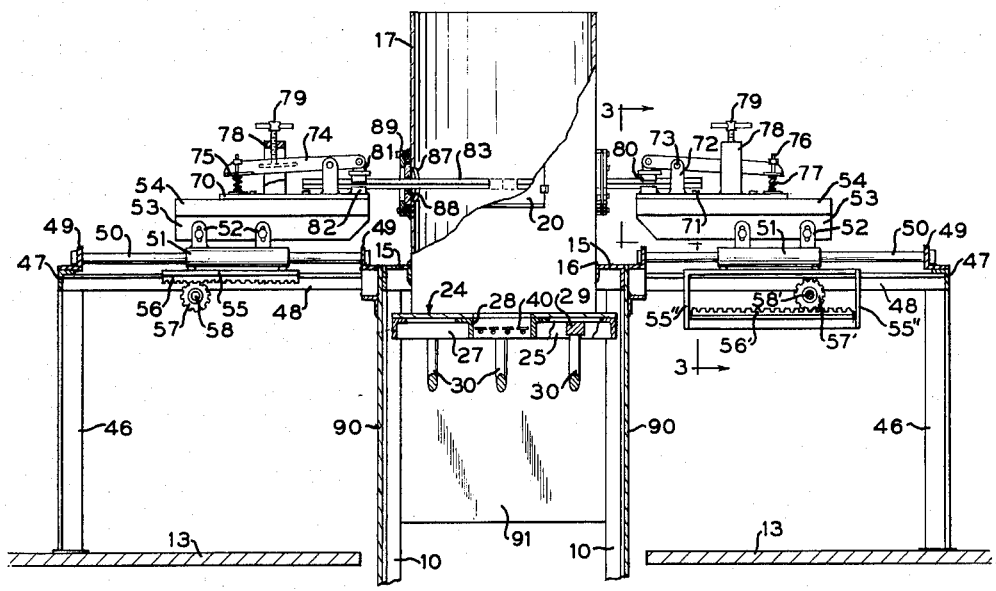
FIG. 2 is a partially broken away side elevational view, taken along line 2—2 in FIG. 1.

The upper part of furnace body 17 extends well above the frame formed by angle irons 14 and channel members 15, while the lower portion of furnace body 17 extends below this frame. It will be understood that furnace body 17 is open both at the top and the bottom. As best seen in FIG. 2, a suitable inspection door 20 is provided in the side of furnace body 17. This door 20 provides ready access to the interior of the furnace so that the electrodes may be inspected and adjusted if desired.

To provide a releasable gate for supporting the silica flour or raw material to be fed into the furnace, I have provided a gate assembly, best seen in FIG. 1. This gate assembly includes a pair of opposed pivot arms 21 which are adapted to pivot about a pivot rod 22. Pivot rod 22 is suitably secured by its ends to two of standards 10 so that pivot arms 21 may pivot toward and away from the bottom of furnace body 17. Pivot arms 21 extend outwardly beyond pivot rod 22 and are provided with a counterbalance weight 23 which runs between the outer ends of arms 21. The inward portions of pivot arms 21 is provided with a flat level plate or gate 24 which is larger than the opening of furnace 17; so that, when arms 21 are pivoted to the horizontal position, gate 24 will close the bottom of furnace body 17. Suitable reinforcing members 25 are provided at the outer ends of pivot arms 21 and between the intermediate portions thereof. In the central portion of gate 24 a rectangular bleeder hole 26 is provided, the purposes of which will be described in more detail later.

Running between arms 21 so as to pass adjacent opposite sides of hole 26 are a pair of reinforcing ribs 27. Additional reinforcing ribs 28 extend between ribs 27 to pass adjacent the other sides of hole 26. A plurality of reinforcing blocks 29 are provided between the reinforcing member 25 and the reinforcing rib 27 which are remote from pivot rod 22. Extending downwardly and outwardly from these blocks 29 are a plurality of spaced gate supporting bars 30 which terminate in a vertically disposed latch plate 31, outwardly adjacent the frame defined by standards 10 and spaced below and parallel to pivot rod 22. Welded to the outer surface of latch plate 31 is a counterbalance shaft 32 from which a plurality of runners 33 project upwardly and outwardly to terminate at counterbalance weight 23.

Journaled by brackets 34, which are mounted on standards 10, is a latch bar 35 provided at one end with a right angularly extending handle 36. Handle 36 is normally secured in place by a removable pin 37 so as to prevent rotation of latch bar 35. Brackets 38, through which pin 37 removably passes, are mounted to the frame of the furnace so that rotation of latch bar 35 is prevented so long as pin 37 engages handle 36; but when pin 37 is removed, bar 35 may be rotated by handle 36. Extending up from latch bar 35, between brackets 34 are a pair of latch plate engaging fingers 39. These fingers 39 are adapted to hold latch plate 31 in place against standards 10 when handle 36 is retained by pin 37 and to be pivoted outwardly when handle 36 is rotated outwardly, thereby to release latch plate 31 and permit the gate assembly to pivot to the position shown by broken lines in FIG. 1. It will be understood, of course, that an operator may close the gate assembly by pulling downwardly upon the counterbalance weight 23, and that the gate assembly may be locked again in closed position by pivoting handle 36 back to its position where pin 37 again retains the same.

Referring now to the central opening or bleeder hole or opening 26 in the gate 24 of the gate assembly, it will be seen that I have provided a baffle means for progressively varying the effective size of bleeder hole 26, including a plurality of shutters 40 which are disposed in the same plane adjacent to each other and immediately below hole 26. Shutters 40 are suitably pivoted upon trunnions 41 journalled by reinforcing ribs 27, so that when shutters 40 are disposed in a horizontal plane they will close hole 26. I have provided means for pivoting these shutters in unison so that they may be rotated from their horizontal position toward a vertical position thereby opening the hole 26. Such means is illustrated as a plurality of lever arms 42 which project down from trunnions 41 to be joined at their lower extremities by a cross bar 43 through pivotal connections 44. Extending outwardly from the central trunnion 41 is a shutter operating shaft 45 which is provided at its end with a right angular bend so that an operator may rotate shaft 45 to rotate the central shutter 40, thereby also rotating the other of the shutters 40 together by means of lever arms 42 and cross bar 43. It will be understood that the right angular bend of the control rod 45 is located between pivot rod 22 and counterbalance weight 23 to be readily accessible to the operator of the furnace. The purposes of this shutter assembly, just described, will be explained hereinafter.

Referring now particularly to FIG. 2, it will be seen that on either side of the frame defined by standards 10, I have provided electrode assembly supporting frames which include uprights 46 mounted on floor 13. The upper ends of uprights 46 terminate in the same plane with the upper ends of standards 10, and these ends are joined by outer beams 47 and cross beams 48 to thereby define a pair of rectangular frames on either side of the furnace body 17. Mounted on these rectangular frames by means of brackets 49 are pairs of diametrically opposed electrode assembly carrying rods 50. Slideably mounted on rods 50, respectively, are sleeves 51, having upstanding braces 52 which project radially therefrom. Extending across between adjacent sleeves 51 are brackets 53 which are secured thereto by bolts passing through appropriate slots in braces 52. Thus a pair of sleeves 51 on one side of furnace body 17 are connected together and will slide together along their respective carrying rods 50 while the pair of sleeves 51 on the other side of furnace body 17 will operate likewise. On top of brackets 53 are the electrode assembly supporting platforms 54 which are preferably made from an electrically insulating material so as to prevent short circuiting or grounding of the electrode assemblies.

Figure 4:
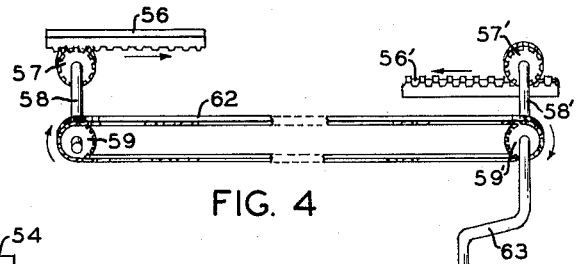
FIG. 4 is a schematic perspective view showing a portion of the electrode control assembly.

The pair of sleeves 51, on the left hand side of furnace 17 in FIG. 2, are also joined together beneath rods 50 by a rack supporting plate 55. The lower surface of the supporting plate 55, is provided with a rack 56 in parallel relationship to sleeves 51. The teeth of rack 56 project downwardly to mesh with the teeth along the upper periphery of a pinion 57 on pinion shaft 58. Pinion shaft 58 is journaled for rotation by brackets (not shown) which extend down from cross beams 48 so that shaft 58 projects outwardly beyond the same and terminates in a sprocket 59 as seen in FIG. 4. Thus, upon rotation of sprocket 59 in clockwise direction, as indicated by the arrow in FIG. 4, pinion 57 will urge rack 56 inwardly toward furnace body 17; and since rack 56 is connected through its plate 55 to sleeves 51, these sleeves will accordingly be urged inwardly, thereby carrying their platform 54 inwardly.

Figure 3:
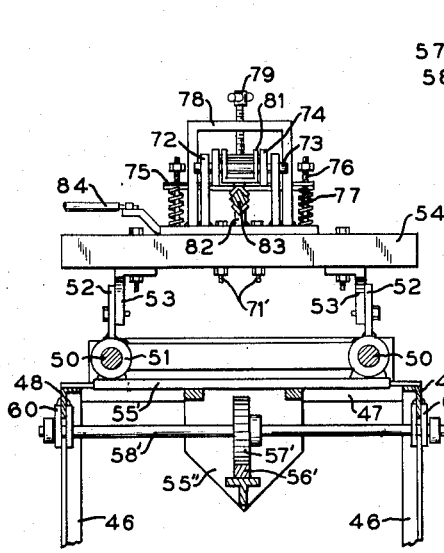
FIG. 3 is a cross sectional view taken along line 3—3 in FIG. 2.

Similarly, the pair of sleeves 51 on the right hand side of furnace 17 are provided with a rack supporting plate 55' which is provided with a rack 56'; however, this rack 56' is supported by a pair of spaced depending brackets 55' so that rack 56' is spaced from plate 55' and its teeth extend upwardly to mesh with the teeth along the lower periphery of a pinion 57'. Pinion 57' is mounted on pinion shaft 58' which is provided with sprocket 59' in alignment with sprocket 59. As best seen in FIG. 3, shaft 58' is journaled for rotation by brackets 60 which depend from cross beams 48. There may be provided for journaling shaft 58' additional journals such as journal 61. Extending around sprockets 59 and 59' is a continuous chain 62, shown in FIG. 4, so that upon rotation of shaft 58' in clockwise direction, shaft 58 will be rotated at the same speed and in the same direction. For this rotation, I have provided a handcrank 63 which is integrally connected to pinion shaft 58'. Thus, upon rotation of crank 63 in clockwise direction, both pinions 56, 56' will be moved inwardly toward furnace body 17 at the same rate of speed. Conversely, when crank 63 is rotated in counterclockwise direction, as viewed in FIG. 4, the pinions 56, 56' will be moved outwardly of furnace body 17. As stated above, the movement of pinions 56 and 56' will accordingly cause movement of platforms 54 inwardly or outwardly simultaneously. Mounted on each of platforms 54 are complementary electrode support means, hence the description of one such electrode assembly will suffice. The electrode assembly includes a base plate 70 formed of conductive material and secured to platform 54 by means of bolts 71. Upstanding from plate 70 are a pair of jaw supporting arms 72 which carry a pivot pin 73 therebetween and on which is pivoted the upper jaw 74 of the electrode clamping assembly.

The end of jaw 74, which is remote from the furnace body 17, is provided with a flat plate 75 having a hole through which a bolt 76 projects to engage base plate 70. Between plate 75 and base plate 70, and surrounding bolt 76 is a spring 77 which normally urges that end of jaw 74 upwardly. To limit the upward movement of that end of jaw 74, I have provided an inverted yoke 78 mounted over jaw 74 and secured to plate 30. Centrally of yoke 78 is a movement limiting screw 79 which projects downwardly to engage the end of jaw 74 which is urged upwardly.

The other end of jaw 74, which is inwardly beyond pivot pin 73, is provided with a V-shaped clamping element 80 which is carried by carrying member 81 pivotally mounted to the end of jaw 74. A complementary stationary clamping element 82 is mounted on plate 70 below clamping element 80 so that through the cooperation of clamping elements 80 and 82, a square electrode 83 may be carried therebetween. It will be understood that by tightening of movement limiting screw 79, the clamping element 80 may be lifted against spring tension of spring 75 and hence permit the replacement of the electrode 83, and that by loosening screw 79, spring 75 acting through jaw 74 will again urge element 80 toward element 82.

It will be understood that electrode assemblies described above are provided on both sides of furnace body 17 so that the electrodes 83 are adapted to project through appropriate openings 87 diametrically opposed in the periphery of furnace body 17 to contact each other, as shown by broken lines in FIG. 2, at the central vertical axis of furnace body 17. Further, it will be understood that by rotation of crank 63, the electrodes 83 may be simultaneously moved toward or away from each other at the same speed so as to maintain the arc generally in the central portion of the furnace as the electrodes 83 are withdrawn.

Figure 9:
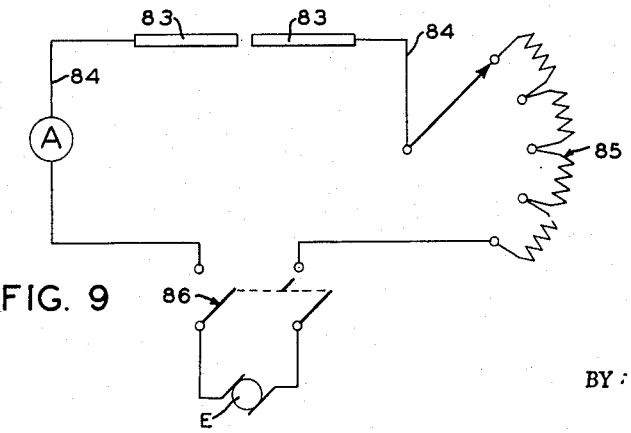
FIG. 9 is a wiring diagram of the electrical circuit of the furnace of FIG. 1.

Of course, it will be also understood by those skilled in the art that suitable current carrying cables 84 are electrically connected to plates 70 so that current passes through the various elements of the electrode assembly and electrodes 83 to maintain such an arc. Referring now to FIG. 9, it will be seen that these cables 84 lead to a rheostat 85, an ammeter "A" and through a switch 86 to a source of current "E," all connected together in series.

To cover the openings 87 through which the electrodes 83 project and thereby to prevent the spilling of any appreciable raw material within the furnace, I have provided suitable insulating grommets 88 which may be retained in place by keeper rings 89. The electrodes 83 thus project through central openings in the insulating grommets 88.

Surrounding the gate assembly are the side plates 90 and a front plate 91 which are secured to standards 10 to define a chute below the furnace body 17. At the lower ends of side plates 90, there is disposed across the frame defined by standards 10 a funnel 92 which feeds to a hopper 93. Between the furnace body 17 and funnel 92 is an inclined grated ramp, the sides 94 of which are secured appropriately to standards 10 and the grate bars 95 of which extend between the sides 94 so as to be disposed across the frame defined by standards 10 and act as a very coarse strainer for the material falling from furnace body 17 into funnel 92. Suitable guide flanges 96 are provided between the sides 94 of the inclined chute, and a suitable splash plate 97 is provided between the upper end of the inclined chute and one side of funnel 92.

In utilizing the apparatus above described, I employ as electrodes 83, electrodes which are 1½" by 1½" square, formed of graphite. These electrodes 83 are usually about 48" long and are rectangular in cross-section. Of course, it will be understood that any high temperature electrodes are suitable for use in the present invention, and hence I do not wish this invention to be limited to the particular type or types of electrodes employed. When the electrodes are mounted in the electrode assemblies, crank 63 is operated to bring the electrode assemblies toward the furnace body 17 until the tips of electrodes 83 touch. Final adjustment of the electrodes may be found necessary in order to position the tips of the electrodes in the central portion of furnace body 17. As best seen in FIG. 3, the electrodes 83 are mounted so that one corner or edge of the electrode is uppermost. This presents the least resistance to the flow of raw material around the electrode.

As a source of current "E," I employ 220 volts A.C. Here again, other relatively low voltages both A.C. and D.C. may be employed in the present invention, and hence the 220 volts A.C. is by way of illustration and not as a way of limitation. The rheostat 85 is sufficient to provide a 0.4 ohm resistance in series with the source of current "E" and electrode 83.

After the electrodes 83 have been installed and checked and brought together, switch 86 is closed and the ammeter A observed to determine whether or not current is flowing. If the electrodes 83 are properly positioned, the ammeter A should be read about 550 amps, it being understood that the rheostat 85 is adjusted so as to provide 0.4 ohms resistance.

Next, the switch 86 is opened and the furnace body 17 is charged with sand of a glass making quality. Usually about 1200 pounds of ground silica flour is charged into the furnace 17. The furnace 17 functions best when the raw material 100 has the following grain sizes:

10% retained on 60 mesh screen
25% retained on 100 mesh screen
15% retained on 140 mesh screen
10% retained on 200 mesh screen
40% less than 200 mesh.

While the optimum size for the silica flour has been specified above, silica flour having an average particle size of −50 mesh to +200 mesh is usable according to my invention. With large grain sizes (above about 50 mesh), the particles of raw material will retard the movement or withdrawal of the electrodes 83 with the viscous fused silica on them. On the other hand, with smaller particle sizes (less than about 200 mesh), the gases formed during the operation of the electrodes 83 will not escape at a proper rate. Thus, the fused silica formed in this process may become contaminated with carbon and the process may take longer and is less efficient.

In loading the silica flour (raw material 100) into the furnace body 17, it is preferable to load the same around the inner periphery of furnace body 17; since, if the silica is directed toward the central portion of the furnace, there is a tendency to break or damage the electrodes 83.

After the silica flour has been loaded into the furnace to extend well above the electrodes 83, switch 86 is again closed and the ammeter A is read to determine that current is flowing between the electrodes 83. Next, the electrodes 83 are pulled apart about two inches or until the ammeter reads about 400 amps. Preferably, the electrodes 83 should be withdrawn slowly from each other so that the arc is maintained at all times. The process is then permitted to run about fifteen minutes at 400 amps, at which time a ball or globe G has been formed around the electrodes 83 and arc. It is important to note that the silica flour is a very good electrical insulator and that if the electrodes 83 were pulled apart too far or too fast, there would be a tendency for the silica flour to fall between the electrodes 83 in sufficient quantity to interrupt the arc.

While the process could proceed at this particular point until a suitable size globe G is formed, for more efficient operation I recommend the following procedure: After the 15 minutes of operation, as above described, .0828 ohms of resistance is by-passed, thus leaving .3172 ohms resistance in series in the circuit. With the reduction of resistance, the reading of the ammeter A should increase to about 550 amps. Thereafter, the electrodes 83 are pulled apart until the ammeter A reads about 450 amps. The process is then permitted to continue for approximately 20 minutes with the ammeter A reading between about 400 and 500 amps. The arc length during this stage is approximately 3 inches. Further, after the 20 minutes, the ball or globe G is about 10 to 12 inches in diameter and weighs about 25 pounds.

Next, the arc is pulled out to about 6 inches (this will lower the amp reading to about 200 amps). Thereafter, .1910 ohms of resistance is cut out of rheosat 85, thus leaving .1262 ohms in series. Again, the electrodes 83 are adjusted to between 400 and 500 amps. At this point there will be a great deal of fluctuation in the ammeter reading; however, by adjusting the arc through the use of crank 63, the ammeter reading can be maintained. Generally, as the operation proceeds, the current will decrease, and hence the electrodes may be withdrawn somewhat. With the additional resistance cut out, leaving .1262 ohms resistance, the arc length will be approximately eight inches at this stage.

Figure 7:
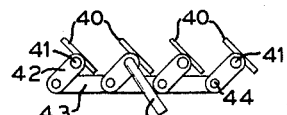
FIG. 7 is a side elevational view of the shutter assembly shown in FIG. 6.

My process is operated for about one and one-half hours at this stage, and the raw material 100 should be bled from the bottom of surface body 17 about every thirty minutes, the bleeding of raw material 100 from the bottom of furnace 17 is accomplished by the operation of shutters 40. To accomplish this, shaft 45 is pivoted, thereby tilting shutters 40 to an angle as shown in FIG. 7. It is therefore seen that I remove the silica flour from beneath the globe G at about the rate at which the bottom portion of globe G grows. The purpose of bleeding the silica flour or raw material 100 from the bottom of furnace body 17 is to provide space for the formation and build up of globe G.

Figure 5:
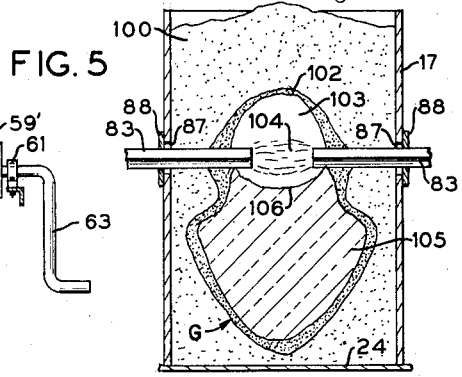
FIG. 5 is a vertical cross sectional view of the furnace shown in FIGS. 1 and 2, showing the formation of the ball of fused silica within the silica flour.
Figure 6:
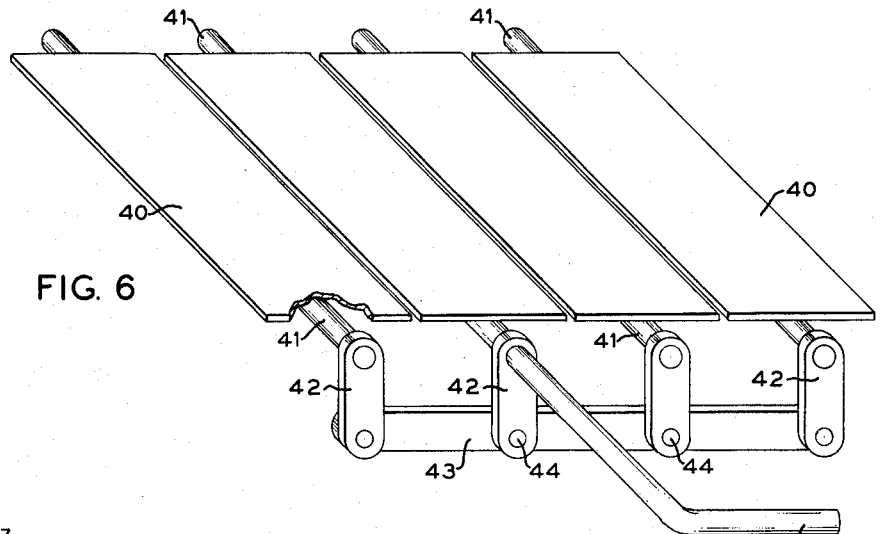
FIG. 6 is partially broken perspective view of the shutter assembly of the furnace shown in FIGS. 1 and 2.
Figure 8:
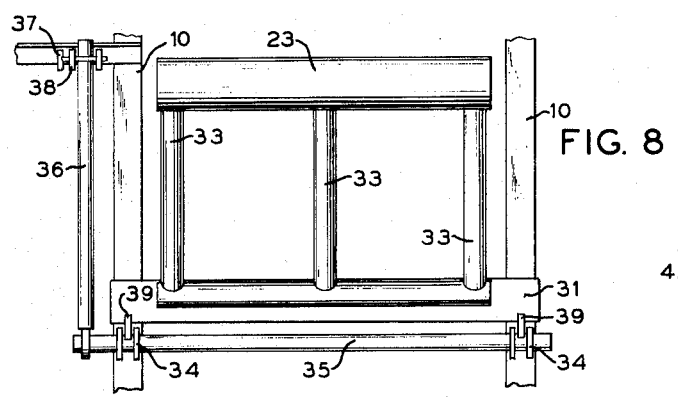
FIG. 8 is a view of a detail showing an end elevation of the latching assembly for the bottom of the furnace shown in FIGS. 1 and 2.

Referring now to FIG. 5, which illustrates the ball or globe G about the size of the ball or globe formed at this stage of my process, it will be seen that globe G includes an upper rounded surface 102, a central hollow area 103, through which the arc 104 discharges between electrodes 83. On the bottom portion of globe G, a large globule 105 of fused silica is formed. This globule 105 becomes progressively larger as the process continues. If the raw material were not bled through hole 26 from the bottom of furnace body 17, the fused silica of the globule 105 would build up along its upper surface 106 until the fused silica protruded into the path of the arc 104 and interrupted the flow of current.

It will be understood by those skilled in the art that within the hollow area 103, through which the arc 104 discharges, there are hot, partially ionized, electrically conducting gases which would sustain a much larger arc than is capable of being sustained in air. These gases are heated to extremely high temperatures, in the neighborhood of 4000° F. and higher, and hence they percolate slowly up through the rounded dome area 102 of the globe G and warm or melt additional silica. The silica of the globe G and the silica in the process of melting tend to flow by gravity around rounded surface 102 toward the globule 105 and there to become again solidified. Of course, as the silica is melted, additional silica or raw material 100 sifts into position against the rounded upper surface 102 of the globe G and hence is melted.

At this final stage, the electrodes 83 are pulled further apart so that the arc 104 is approximately 10 inches long and the ammeter reads about 300 amps. Then .0625 ohm resistance is dropped by operation of rheostat 85 so that the remaining resistance is .061 ohm in series with the arc 104. The electrodes 83 are again adjusted so that the ammeter A reads between 400 and 500 amps. Fluctuation is now very substantial because of the small amount of resistance being used as a stabilizer. The operation is continued for approximately one hour in this stage. During this final stage and the preceding stage, it may be found necessary to open the shutter door or shutters 40 more and more frequently. Usually, shutters 40 should be opened about every ten minutes during the final stage.

After approximtaely the above stated one hour has elapsed, the electrodes 83 are withdrawn to their extreme positions, thereby "popping" the arc 104 and interrupting the current flow. Thereafter, the globe G which is now approximately five hundred pounds in weight, is permitted to cool in furnace body 17 for about five minutes. From the foregoing description, it is apparent that I have so manipulated the electrodes and raw material charge that the silica within the ball remains within about 500° C. above its melting point. In other words the temperature of the liquid silica in the globe or ball is from about 1728° C. to about 2228° C.

Figure 10:
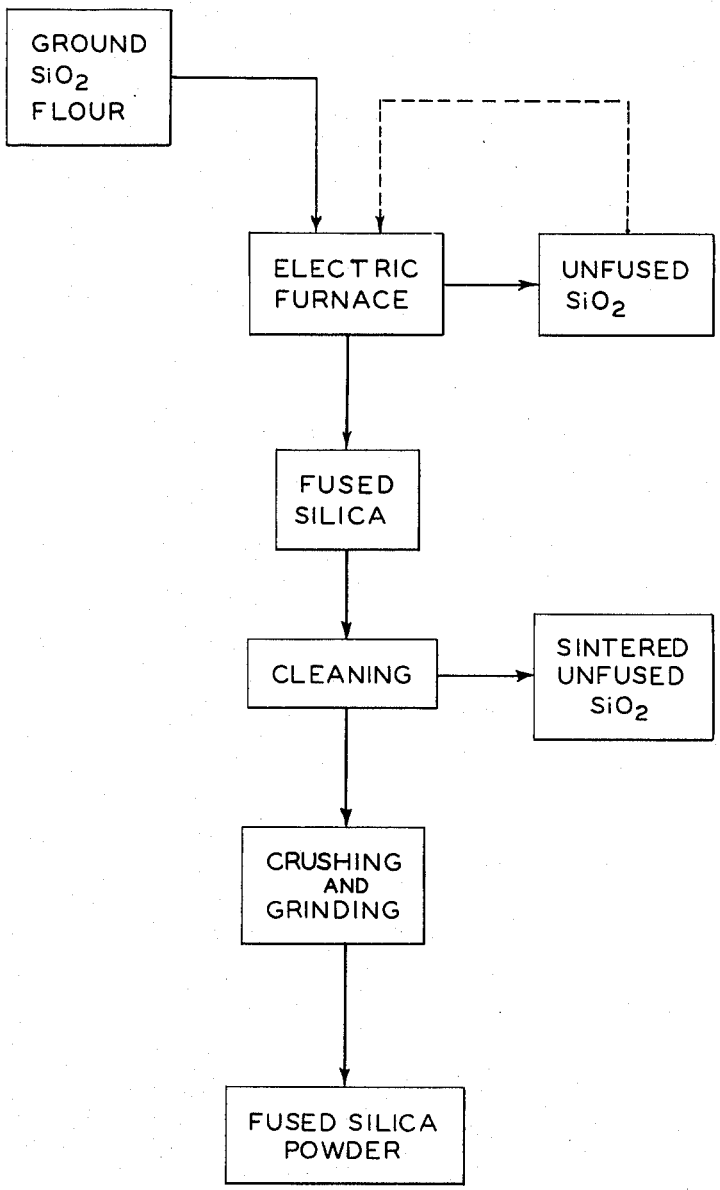
FIG. 10 is a flow diagram of the process of the present invention.

Next, the gate assembly is operated by removing pin 37 from its brackets 38, thereby releasing latch plate 31 to permit the gate assembly to pivot to the position shown in broken lines in FIG. 1. The raw material 100 and the globe G are thus dropped onto the inclined grated chute where the grates 95 direct the globe G down the chute, and the unmelted raw material or silica flour 100 falls into funnel 92 and thence into hopper 93. Referring to FIG. 10, it will be seen that this raw material from hopper 93 eventually will be reused in a subsequent run. The globe G of fused silica is next cleaned to remove the peripherial partially fused silica. Thereafter the globe G is comminuted to desired size.

Of course, in some instances, where it is not necessary to provide an extremely high grade of fused silica, it will not be necessary to chip or remove the unfused sintered silica from the outside surface of the globe G. Instead, the globe G, after cooling, can be comminuted.

For the comminuting of the globe G, I prefer to use first a jawmill which breaks the globe G into a particle size which may be easily handled. These particles are then loaded into a pebble or ball mill which is run until the desired final particle size is obtained.

As pointed out above, the 1200 pounds of raw material is converted into about 500 pounds of silica and about 600 pounds of the raw material is recovered for re-use. In this process approximately 100 pounds of the raw material is unaccounted for, and I presume that a substantial part of this was water which converted into water vapor and passed into the atmosphere, the other portion of the raw material which is unaccounted for is probably lost in handling.

After reducing to the desired particle size, the fused silica may be screened or otherwise classified.

Usually it requires about 300 kilowatt hours of electricity to provide 500 pounds of fused silica, according to my invention. Further, one man can probably operate three such furnaces as I have here disclosed.

While the operation of my furnace has been directed specifically to the production of fused silica, it will be apparent that the furnace can be used advantageously for melting alumina, magnesium oxide, zirconium oxide, clay, bauxite, mullite, and other refractories.

It will be obvious to those skilled in the art that many variations may be made in the embodiments of my invention here disclosed, other high viscosity materials may be melted as described herein, full resort may be had to the use of equivalents, and parts may be combined or made integral without departing from the scope of my invention as defined by the appended claims.

I claim:

1. In a process of producing fused silica, creating an electrical discharge between opposed approximately horizontally disposed electrodes, surrounding said electrical discharge with unfused silica flour having an average grain size of from −50 mesh to +200 mesh, and maintaining said discharge at such a rate that a globe of molten silica is created surrounding said electrical discharge and said electrodes.

2. A process of producing fused silica comprising creating an electric arc heat source completely surrounded by unfused granular silica raw material, said heat source being at a temperature above 3142° F., maintaining said heat source at a rate and temperature sufficient to melt said silica raw material next adjacent said heat source and created a ball of molten viscous silica around said heat source, surrounding and supporting said ball with the silica raw material during the entire period in which it surrounds the heat source, thereafter removing said heat source from the interior of said ball and cooling said ball.

3. In a process of producing fused silica, the steps of adjusting a pair of electrodes to contact each other, surrounding said electrodes with unfused granular silica raw material, supporting said granular silica raw material at a spaced distance beneath said electrodes, discharging a current through said electrodes while withdrawing said electrodes from each other to create a globe of molten silica around said electrodes and the discharge between said electrodes, and periodically removing a portion of said silica flour from beneath said globe at about the rate at which the bottom portion of said globe grows.

4. In a process of melting a material which has a relatively high viscosity when molten, disposing a pair of gas forming electrodes adjacent and in opposed condition with respect to each other, disposing said material around said electrodes such that an appreciable amount of material is beneath the opposed ends of said electrodes, creating an electrical discharge across said electrodes to melt a portion of said material to create a gas filled hollow ball of molten material through which said electrodes project, continuing said electrical discharge to heat the gas of said ball and thereby melt additional material and induce the molten material to flow by gravity and build up along the bottom portion of said hollow ball, and thereafter withdrawing said electrodes from said ball to interrupt said discharge.

5. Process of producing fused silica from silica in granular form comprising the steps of passing current through a pair of horizontally disposed electrodes to create an arc for establishing a central heat source sufficient to melt said silica in granular form, surrounding said central heat source with said silica in granular form, operating said central heat source for sufficient time to melt the portion of said silica in granular form next adjacent said heat source to form a ball of molten silica surrounding said heat source while establishing sufficient gas within said ball to support the walls of the same, continuing the operation of said heat source to melt additional of said silica in granular form sufficiently that it flows into said ball and the molten silica of said ball flows by gravity toward the bottom of said ball, removing said silica in granular form from beneath said ball at about the same rate as said ball grows, thereafter discontinuing the operation of said heat source and cooling said ball.

6. In a process of producing fused silica, the steps of disposing a pair of electrodes with their ends adjacent and in opposed condition with respect to each other, surrounding the ends of said electrodes with silica flour such that an appreciable amount of material is beneath the opposed ends of said electrodes, releasably supporting the lower portion of said silica flour, creating an electrical discharge across the ends of said electrodes of sufficient intensity to create a globe of molten material from and surrounded by the silica flour and gas in the interior of the globe by which the globe is supported, continuing said electrical discharge to melt additional silica flour and to induce the molten material to flow downwardly away from said electrodes and build up along the bottom portion of the globe, releasing the supported silica flour at about the rate at which the globe builds up so as to provide the additional room required by the globe, withdrawing the electrodes from each other at about the rate at which the globe builds up therebetween, and thereafter withdrawing said electrodes from said globe to interrupt the electrical discharge.

7. In a process of producing fused silica, the steps of disposing a pair of electrodes horizontally with their ends adjacent and in opposed condition with respect to each other, surrounding the ends of said electrodes with silica flour having a grain size of from −50 mesh to +200 mesh, releasably supporting the lower portion of said silica flour, creating an electrical discharge across the ends of said electrodes of sufficient intensity to melt the silica flour and create a globe of molten material from and surrounded by the silica flour and gas in the interior of the globe by which the globe is supported, continuing said electrical discharge to melt additional silica flour and to induce the molten material to flow downwardly away from said electrodes and build up along the bottom portion of the globe, releasing the supported silica flour at about the rate at which the globe builds up so as to provide the additional room required by the globe, withdrawing the electrodes from each other at about the rate at which the globe builds up therebetween, and thereafter withdrawing said electrodes from said globe to interrupt the electrical discharge.

8. In a process of producing fused silica, the steps of disposing a pair of electrodes horizontally with their ends adjacent and in opposed condition with respect to each other, surrounding the ends of said electrodes with silica flour having a grain size of from −50 mesh to +200 mesh, releasably supporting the lower portion of said silica flour, creating an electrical discharge across the ends of said electrodes of sufficient intensity to create a globe of molten material from and surrounded by the silica flour and gas in the interior of the globe by which the globe is supported, continuing said electrical discharge to melt additional silica flour and to induce the molten material to flow downwardly away from said electrodes and build up along the bottom portion of the globe, releasing the supported silica flour at about the rate at which the globe builds up so as to provide the additional room required by the globe, withdrawing the electrodes from each other at about the rate at which the globe builds up therebetween, thereafter withdrawing said electrodes from said globe to interrupt the electrical discharge, and separating the globe from the silica flour and comminuting said globe.

References Cited in the file of this patent

UNITED STATES PATENTS

| | | |
|---|---|---|
| Re. 13,504 | Bottomley et al. | Jan. 7, 1913 |
| 704,993 | Weber | July 15, 1902 |
| 761,111 | Thomson | May 31, 1904 |
| 801,378 | Hart | Oct. 10, 1905 |
| 931,945 | Mehner | Aug. 24, 1909 |
| 993,105 | Reid | May 23, 1911 |
| 1,438,936 | Eimer | Dec. 12, 1922 |
| 1,621,446 | Watson | Mar. 15, 1927 |
| 2,074,819 | Weitzenkorn | Mar. 23, 1937 |
| 2,398,952 | Hachod | Apr. 23, 1946 |

FOREIGN PATENTS

| | | |
|---|---|---|
| 242,214 | Great Britain | Dec. 31, 1925 |